(12) United States Patent
G V et al.

(10) Patent No.: US 9,689,473 B2
(45) Date of Patent: Jun. 27, 2017

(54) MULTI-MODE HYBRID TRANSMISSION USING SINGLE PLANETARY GEAR

(71) Applicant: GM GLOBAL TECHNOLOGY OPERATIONS LLC, Detroit, MI (US)

(72) Inventors: Ravikanth G V, Karnataka (IN); Sandhu Kurian Kurian, Kerala (IN); Hashim Mm, Karnataka (IN); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 94 days.

(21) Appl. No.: 14/832,365

(22) Filed: Aug. 21, 2015

(65) Prior Publication Data

US 2017/0051812 A1    Feb. 23, 2017

(51) Int. Cl.
*F16H 3/72* (2006.01)
*F16H 37/08* (2006.01)
*B60K 6/365* (2007.10)
*B60K 6/547* (2007.10)

(52) U.S. Cl.
CPC ............ *F16H 3/728* (2013.01); *B60K 6/365* (2013.01); *B60K 6/547* (2013.01); *F16H 3/725* (2013.01); *F16H 37/0813* (2013.01); *F16H 37/0833* (2013.01); *B60Y 2200/92* (2013.01); *B60Y 2400/73* (2013.01); *B60Y 2400/80* (2013.01); *Y10S 903/91* (2013.01); *Y10S 903/919* (2013.01)

(58) Field of Classification Search
CPC .......... F16H 3/725; F16H 3/728; F16H 37/08; F16H 37/0806; F16H 37/0813; F16H 37/0826; F16H 37/0833; B60K 6/365; B60K 6/547
See application file for complete search history.

(56) References Cited

U.S. PATENT DOCUMENTS

| 6,945,894 | B2 | 9/2005 | Holmes | |
| 7,980,980 | B2* | 7/2011 | Rask | B60K 6/445 475/150 |
| 8,738,207 | B2 | 5/2014 | Holmes et al. | |
| 2007/0145749 | A1* | 6/2007 | Holmes | B60K 6/365 290/45 |
| 2015/0204424 | A1* | 7/2015 | Meißner | F16H 3/725 475/5 |

* cited by examiner

*Primary Examiner* — Jacob S Scott
(74) *Attorney, Agent, or Firm* — Quinn IP Law (57) ABSTRACT

A transmission includes a single planetary gearset, a first torque machine, an output member and a two-speed gearset that is coupled to the drive member. The single planetary gearset includes a sun gear, a carrier gearset and a ring gear, wherein the carrier gearset is rotatably couplable to the input member and rotatably couplable to the output member, the sun gear is rotatably coupled to a rotor of the first torque machine, and the ring gear is rotatably couplable to the input member and rotatably couplable to the output member. The output member is rotatably couplable to the two-speed gearset, which is configured to operate in one of a first gear ratio and a second gear ratio.

18 Claims, 4 Drawing Sheets

MULTI-MODE HYBRID TRANSMISSION USING SINGLE PLANETARY GEAR

TECHNICAL FIELD

The concepts in this disclosure relate to power transmission devices.

BACKGROUND

Power transmission devices are employed to transfer mechanical power between one or a plurality of prime movers and a final drive system. Known prime movers include internal combustion engines and non-combustion torque machines. A final drive system may include a differential or other gearing, belt or chain drive mechanisms or fluidic systems that transfer mechanical power to accomplish work. When the power transmission device is employed on a vehicle, the final drive system may include axles that transfer power to vehicle wheels for tractive effort.

SUMMARY

A transmission for transferring mechanical power between an input member and a drive member is described, and includes a single planetary gearset, a first torque machine, an output member and a two-speed gearset that is coupled to the drive member. The single planetary gearset includes a sun gear, a carrier gearset and a ring gear, wherein the carrier gearset is rotatably couplable to the input member and rotatably couplable to the output member, the sun gear is rotatably coupled to a rotor of the first torque machine, and the ring gear is rotatably couplable to the input member and rotatably couplable to the output member. The output member is rotatably couplable to the two-speed gearset, which is configured to operate in one of a first gear ratio and a second gear ratio. The transmission operates in an input power split mode at a first final drive ratio to transfer power between the input member, the drive member and the first torque machine by coupling the input member to the ring gear, coupling the output member to the carrier gearset, and operating the two-speed output gearset at the first gear ratio. The transmission operates in an output power split mode at a second final drive ratio to transfer power between the input member, the drive member and the first torque machine by coupling the input member to the carrier gearset, coupling the output member to the ring gear, and operating the two-speed output gearset at the second gear ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

Figure 1:
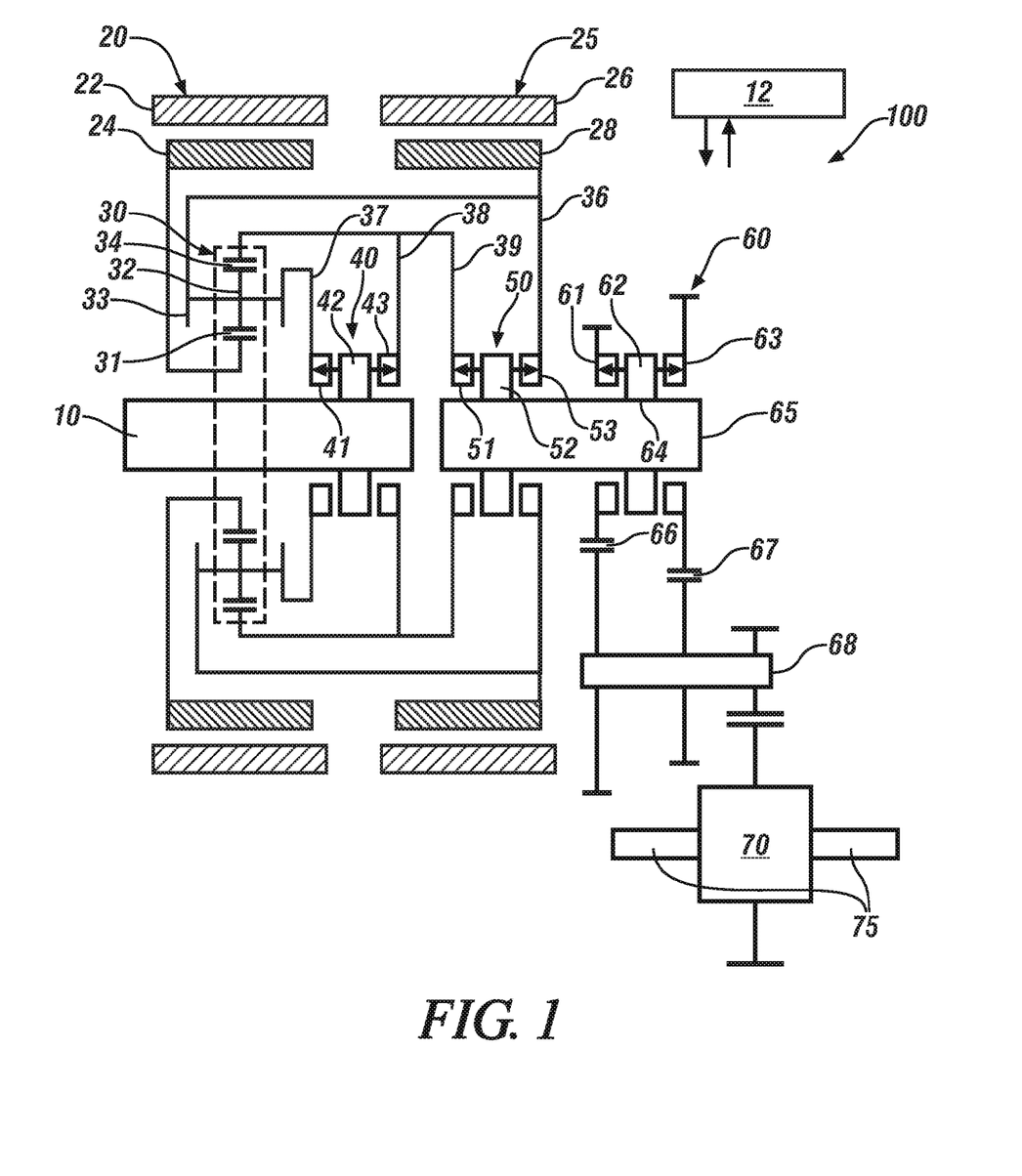
FIG. 1 schematically illustrates an embodiment of a multi-mode transmission for transferring mechanical power between a prime mover and an axle that includes an input member, first and second torque machines, a single planetary gearset, an output member and a two-speed gearbox, in accordance with the disclosure.

Referring to the drawings, wherein like numerals indicate like or corresponding parts throughout the several views, FIG. 1 schematically illustrates an embodiment of a multi-mode transmission 100 for transferring mechanical power between a prime mover and a differential 70 coupled to one or multiple axles 75. The multi-mode transmission 100 includes an input member 10, a single planetary gearset 30, an output member 65, a two-speed gearbox 60 that couples to the differential 70 and axles 75 to drive one or a plurality of vehicle wheels. Like numerals indicate like elements in the various embodiments. The prime mover may include an internal combustion engine that rotatably couples to the input member 10. First and second non-combustion torque machines (torque machines) 20, 25, respectively are integrated into the multi-mode transmission 100. In one non-limiting embodiment, and as described herein, the first and second torque machines 20, 25 are multi-phase electrically-powered motor/generators that electrically connect to high-voltage electrical energy storage devices via inverters and various electrical connectors and harnesses. The first torque machine 20 includes a stator 22 and a rotor 24. The second torque machine 25 includes a stator 26 and a rotor 28. As used herein, the term "couple" and related terms describe a mechanical fastening or linkage of two or more elements such that movement, e.g., rotation, of one of the elements results in a corresponding movement of the other element(s). As used herein, the term "couplable" and related terms describe a capability to mechanically fasten or link two or more elements such that movement, e.g., rotation, of one of the elements results in a corresponding movement of the other element(s), with the capability to mechanically fasten or link the two elements accomplished with a device such as a controllable clutch.

Rotatable coupling and torque transfer between the input member 10, the first and second torque machines 20, 25, the single planetary gearset 30 and the two-speed gearbox 60 to the differential 70 is achieved by selective activation of input, output and final clutches 40, 50 and 62, respectively. In this embodiment, the input, output and final clutches 40, 50, 62 are three-state clutch devices. Alternatively, the final clutch 62 may be a two-state clutch. Operational control and monitoring of the first and second torque machines 20, 25 and control of input, output and final clutches 40, 50 and 62 is controlled by a controller 12.

The transmission 100 may be equipped with various hydraulic circuits and actuators, rotational speed sensors, pressure sensors, temperature sensors, bearings and other known elements that are known and not described herein in detail.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals or in response to occurrence of a triggering event. Communications between controllers and between controllers, actuators and/or sensors may be accomplished using a direct wired link, a networked communications bus link, a wireless link or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The input clutch 40, output clutch 50 and final clutch 62 are controllable three-state clutch devices. In one embodiment, the input clutch 40, output clutch 50 and final clutch 62 are double-sided dog clutches including a spline and two collars that are paired back-to-back, for ease of actuation in situations where both clutches are not actuated simultaneously. A dog clutch is a type of clutch in which two rotating members are coupled by interference between the spline and male section on one member and the corresponding collar or female section on the adjoining member. Other clutch devices may be employed, without limitation. The input clutch 40 may be a controllable three-state device that includes a moveable spline 42 that rotatably couples to the input member 10. The moveable spline 42 translates along the input member 10 to a first state, a second state and a third state, wherein such translation is achieved by controlling a linear actuator connected thereto using hydraulic pressure supplied through a hydraulic circuit or another suitable actuation mechanism. The moveable spline 42 rotatably couples the input member 10 to a first collar 41 when controlled to the first state and rotatably couples the input member 10 to a second collar 43 when controlled to the third state. The input clutch 40 is in a neutral state when the moveable spline 42 is controlled to the second state. The output clutch 50 may be a controllable three-state device that includes a moveable spline 52 that rotatably couples to the output member 65. The moveable spline 52 rotatably couples the output member 65 to a third collar 51 when controlled to the first state and rotatably couples the output member 65 to a fourth collar 53 when controlled to the third state. The output clutch 50 is in a neutral state when the moveable spline 52 is controlled to the second state. The final clutch 62 may be a controllable three-state device that includes a moveable spline 64 that rotatably couples to the output member 65. The moveable spline 64 rotatably couples the output member 65 to a fifth collar 61 when controlled to the first state and rotatably couples the output member 65 to a sixth collar 63 when controlled to the second state. The final clutch 62 is in a neutral state when the moveable spline 64 is controlled to the third state.

The planetary gearset 30 includes a sun gear 31 and a ring gear 34 with a plurality of intervening planet gears 32 coupled by a planet carrier 33. Planetary gearsets are known to those skilled in the art. The sun gear 31 is preferably coaxial with the input member 10 and rotatably couples with the rotor 24 of the first torque machine 20. The planet carrier 33 rotatably couples with a first rotating element 36 that rotatably couples with the fourth collar 53 of the output clutch 50 and rotatably couples with a second rotating element 37 that rotatably couples with the first collar 41 of the input clutch 40. The planet carrier 33 rotatably couples via the first rotating element 36 with the rotor 28 of the second torque machine 25. The ring gear 34 rotatably couples with a third rotating element 38 that couples with the second collar 43 of the input clutch 40, and rotatably couples with a fourth rotating element 39 that couples with the third collar 51 of the output clutch 50.

The two-speed gearbox 60 is a helical gear pair or other known device having a low-speed gearset 66 and a high-speed gearset 67 that are alternately selectable gearsets that are arranged in parallel, resulting in first and second gear ratios that are selectable based upon the coupling to the input members as described herein.

When the input clutch 40 is controlled to the first state, the input member 10 rotatably couples to the planet carrier 33 via the second rotating element 37 by engaging the first collar 41. When the input clutch 40 is controlled to the second state, the input member 10 rotatably couples to the ring gear 34 via the third rotating element 38 by engaging the second collar 43. When the input clutch 40 is controlled to the third state, the input member 10 is disengaged from both the planet carrier 33 and the ring gear 34.

When the output clutch 50 is controlled to the first state, the output member 65 rotatably couples to the ring gear 34 via the fourth rotating member 39 by engaging the third collar 51. When the output clutch 50 is controlled to the second state, the output member 65 rotatably couples to the planet carrier 33 via the first rotating member 36 by engaging the fourth collar 53. When the output clutch 50 is controlled to the third state, the output member 65 is disengaged from both the planet carrier 33 and the ring gear 34.

Thus, as described herein, the first electric machine 20 mechanically couples to the sun gear 31 and the second electric machine 25 mechanically couples to the planet carrier 33, the input member 10 selectively mechanically couples to the ring gear 34 and the planet carrier 33, and the output member 65 selectively mechanically couples to the ring gear and the planet carrier 33. In one alternative embodiment, the first electric machine 20 can mechanically couple to the sun gear 31, the second electric machine 25 can mechanically couple to the ring gear 34, the input member 10 can selectively mechanically couple to the ring gear 34 and the planet carrier 33, and the output member 65 can selectively mechanically couple to the ring gear and the planet carrier 33. In another alternative embodiment, the first electric machine 20 can mechanically couple to the carrier gear 33, the second electric machine 25 can mechanically couple to the sun gear 31, the input member 10 can selectively mechanically couple to the ring gear 34 and the sun gear 31, and the output member 65 can selectively mechanically couple to the ring gear 34 and the and the sun gear 31.

The first low-speed gearset 66 or the second high-speed gearset 67 selectively couple via the final clutch 62 to a drive member 68 to transfer mechanical power to the differential 70. The first gearset 66 includes a fifth collar 61 that is selectively engaged by a disc element of the third clutch 62 when it is controlled to a first state, and the second gearset 67 includes a sixth collar 63 that is selectively engaged by the disc element of the final clutch 62 when it is controlled to a second state. When the final clutch 62 is control to the third state, the output member 65 is disengaged from the drive member 68.

Operation of the transmission 100 may be best described in context of a clutch activation table, as follows.

TABLE 1

| Transmission state | Input Clutch State | Output Clutch State | Final Clutch State |
|---|---|---|---|
| | Clutch States (first, second, third) | | |
| | C-R-O | C-R-O | 1-2-0 |
| EVT1 - Input-split | R | C | 1 |
| EVT2 - Output-split | C | R | 2 |
| EV1 | O | C | 1 |
| EV2 | O | C | 2 |
| Fixed gear ratio 1 | C | C | 1 |
| Fixed gear ratio 1 | R | R | 1 |
| Fixed gear ratio 2 | R | R | 2 |
| Fixed gear ratio 2 | C | C | 2 |
| Neutral | — | — | 0 |

The transmission states include electrically variable transmission states, electric-only (EV) states, fixed gear states, neutral and reverse that are achieved through selective activation of states of the input clutch 40, the output clutch 50 and the final clutch 62 as detailed in Table 1.

The prime movers may include an internal combustion engine that rotatably couples to the input member 10, and the first and second torque machines 20, 25 that generate mechanical power that is in the form of torque and rotational speed. The mechanical power may be in the form of positive torque for tractive effort or propulsion. The mechanical power may be in the form of reactive torque, that may be employed for electric power generation through either or both the first and second torque machine The electrically variable transmission (EVT) states include operation wherein mechanical power inputs through the input member 10, the first torque machine 20 and the second torque machine 25 are transferred to the drive member 68 and rotational speed of the output member 65 is determined based upon the rotational speeds of the input member 10 and the first torque machine 20. Thus, mechanical power input through the input member 10 may be supplemented by mechanical power from the first torque machine 20 to provide output power to the drive member 68, or mechanical power input through the input member 10 may be split to supply mechanical power to the first torque machine 20 and to provide output power to the drive member 68.

The input-split transmission state is an EVT state in which the transmission 100 operates with a high effective transmission ratio, with the final drive ratio determined by the rotational speed of the first torque machine 20. Mechanical power that is input to the input member 10, e.g., from an internal combustion engine, may be split by transferring a portion to the first torque machine 20 and transferring a portion to the output member 65, with additional mechanical power transferred from the second torque machine 25 to the output member 65. This is accomplished by controlling the input clutch 40 in the second state (R), controlling the output clutch 50 to the first state (C) and controlling the final clutch 62 to the first state (1).

The output-split transmission state is an EVT state in which the transmission 100 operates with a low effective transmission ratio, with the final drive ratio determined by the rotational speed of the second torque machine 25. Mechanical power that is input to the input member 10, e.g., from an internal combustion engine, may be transferred to the output member 65 along with power from the first torque machine 20. Mechanical power from the second torque machine 25 may be split between the output member 65 and the first torque machine 20. This is accomplished by controlling the input clutch 40 in the first state (C), controlling the output clutch 50 to the second state (R) and controlling the final clutch 62 to the second state (2).

The electric-only (EV) states include operation wherein mechanical power generated by the second torque machine 25 is transferred to the drive member 68. There is no mechanical power input through the input member 10. The rotational speed of the output member 65 is determined based upon the rotational speeds of the first and second torque machines 20, 25.

The fixed gear states include operation wherein mechanical power through the input member 10 and generated by the first torque machine 20 and the second torque machine 25 are transferred to the drive member 68 at a rotational speed that is proportional to a rotational speed of the input member 10.

The neutral state may be achieved by controlling the final clutch 62 in the open state (0).

The reverse state may be achieved by operating in either EV1 or EV2, and operating the second torque machine 25 to apply torque in the opposite direction.

Shifting between the transmission states may be accomplished synchronously by controlling the final clutch 62 to the third, neutral state (0) and disengaging the output member 65 from the drive member 68. Such operation allows the first torque machine 20 to be controlled to a speed that achieves a synchronous shifting of the input clutch 40 and the output clutch 50. The rotational speed of the output member 65 may be controlled to synchronously engage the final clutch 62.

One exemplary upshift sequence includes shifting from the input-split transmission state to the output-split transmission state by releasing the final clutch 62, i.e., controlling it to the neutral state (0), and then controlling the first and second torque machines 20, 25 to synchronize the elements of the input and output clutches 40, 50. The input clutch 40 shifts from the second state (R) to the first state (C) and the output clutch 50 shifts from the first state (C) to the second state (R) after synchronization. The first and second torque machines 20, 25 are controlled to synchronize the rotational speed of the output member 65 with the low-speed gearset 66. The final clutch 62 is applied in the first state (1) after synchronization.

One exemplary downshift sequence includes shifting from the output-split transmission state to the input-split transmission state by releasing the final clutch 62, i.e., controlling it to the neutral state (0), and then controlling the first and second torque machines 20, 25 to synchronize the elements of the input and output clutches 40, 50. The input clutch 40 shifts from the first state (C) to the second state (R) and the output clutch 50 shifts from the second state (R) to the first state (C) after synchronization. The first and second torque machines 20, 25 are controlled to synchronize the rotational speed of the output member 65 with the high-speed gearset 67. The final clutch 62 is applied in the second state (2) after synchronization.

Figure 2:
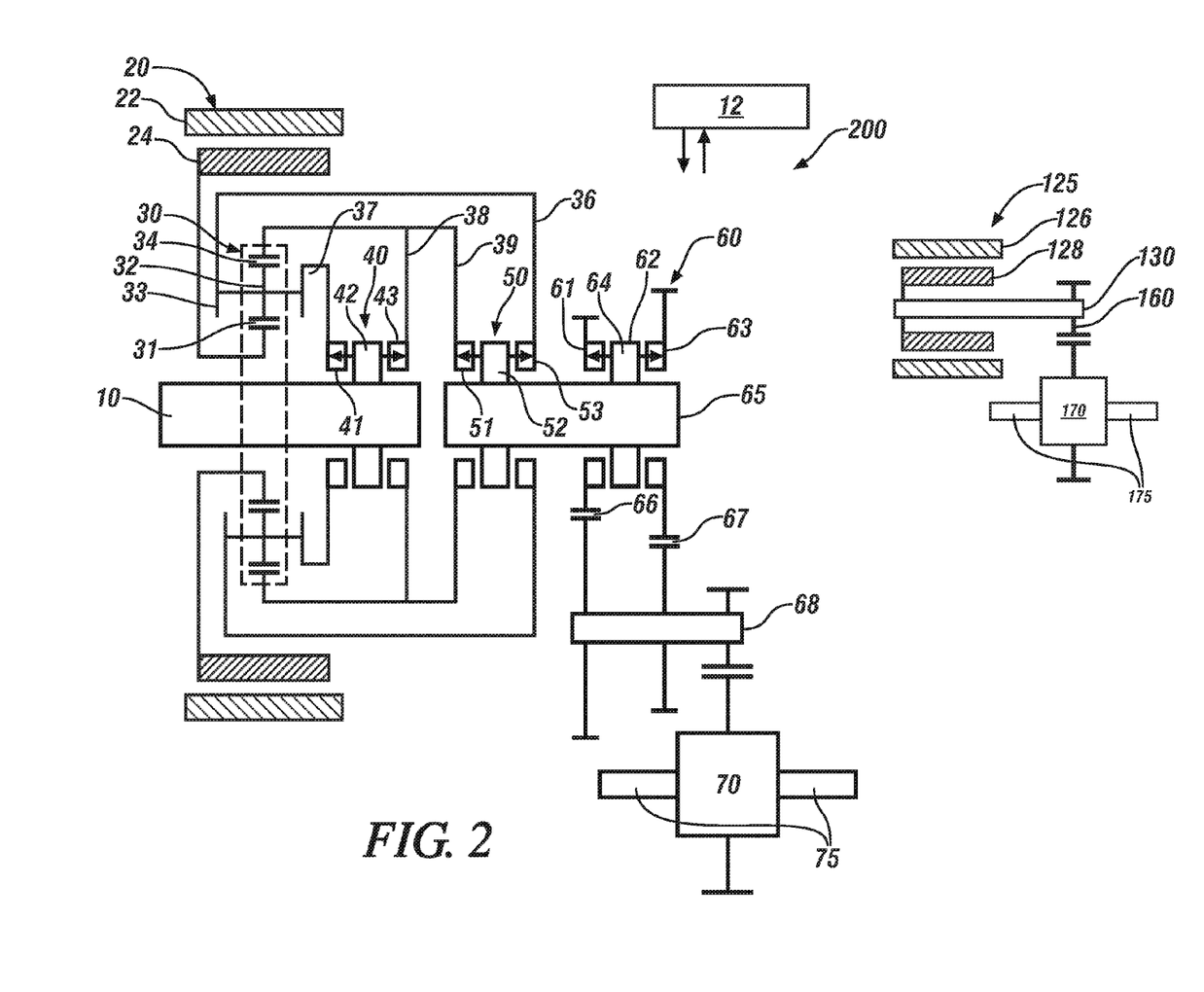
FIG. 2 schematically illustrates an embodiment of a multi-mode transmission for transferring mechanical power between a prime mover and an axle that includes an input member, a first torque machine, a single planetary gearset, an output member, and a two-speed gearbox, wherein a second torque machine rotatably couples to a second differential coupled to a second axle to provide four-wheel or all-wheel drive capability to a vehicle, in accordance with the disclosure.

FIG. 2 schematically illustrates another embodiment of a multi-mode transmission 200 that is analogous to the multi-mode transmission 100 shown with reference to FIG. 1. The multi-mode transmission 200 differs from the multi-mode transmission 100 described with reference to FIG. 1 in that the multi-mode transmission 200 employs only the first torque machine 20, with a second torque machine 125 including stator 126 and rotor 128 rotatably coupled via a rotating member 130 to gearset 160 that rotatably couples to a second differential 170 that couples to second axles 175, thus providing four-wheel or all-wheel drive capability to the vehicle. Thus, in this embodiment the second torque machine 125 is not coupled to the first rotating element 36 coupled to the planetary gear set 30. Operation of the transmission 200 may be best described in context of a clutch activation table, as follows.

TABLE 2

| | Input Clutch State | Output Clutch State | Final Clutch State |
|---|---|---|---|
| | Clutch States (first, second, third) | | |
| Transmission state | C-R-O | C-R-O | 1-2-0 |
| EVT1 - Input-split | R | C | 1 |
| EVT2 - Input-split | C | R | 2 |
| EV | — | — | 0 |
| Fixed gear ratio 1 | C | C | 1 |
| Fixed gear ratio 1 | R | R | 1 |
| Fixed gear ratio 2 | R | R | 2 |
| Fixed gear ratio 2 | C | C | 2 |
| Neutral | — | — | 0 |
| EVT Reverse | C | R | 2 |
| EV Reverse | — | — | 0 |

The transmission states include electrically variable transmission states, electric-only (EV) states, fixed gear states, neutral and reverse that are achieved through selective activation of states of the input clutch 40, the output clutch 50 and the final clutch 62 as detailed in Table 2. Reverse may be achieved in either EV or EVT2 with the second torque machine 125 operated to apply torque in the opposite or reverse direction. The rotational speed of the second torque machine 125 is proportional to vehicle speed in this embodiment.

Figure 3:
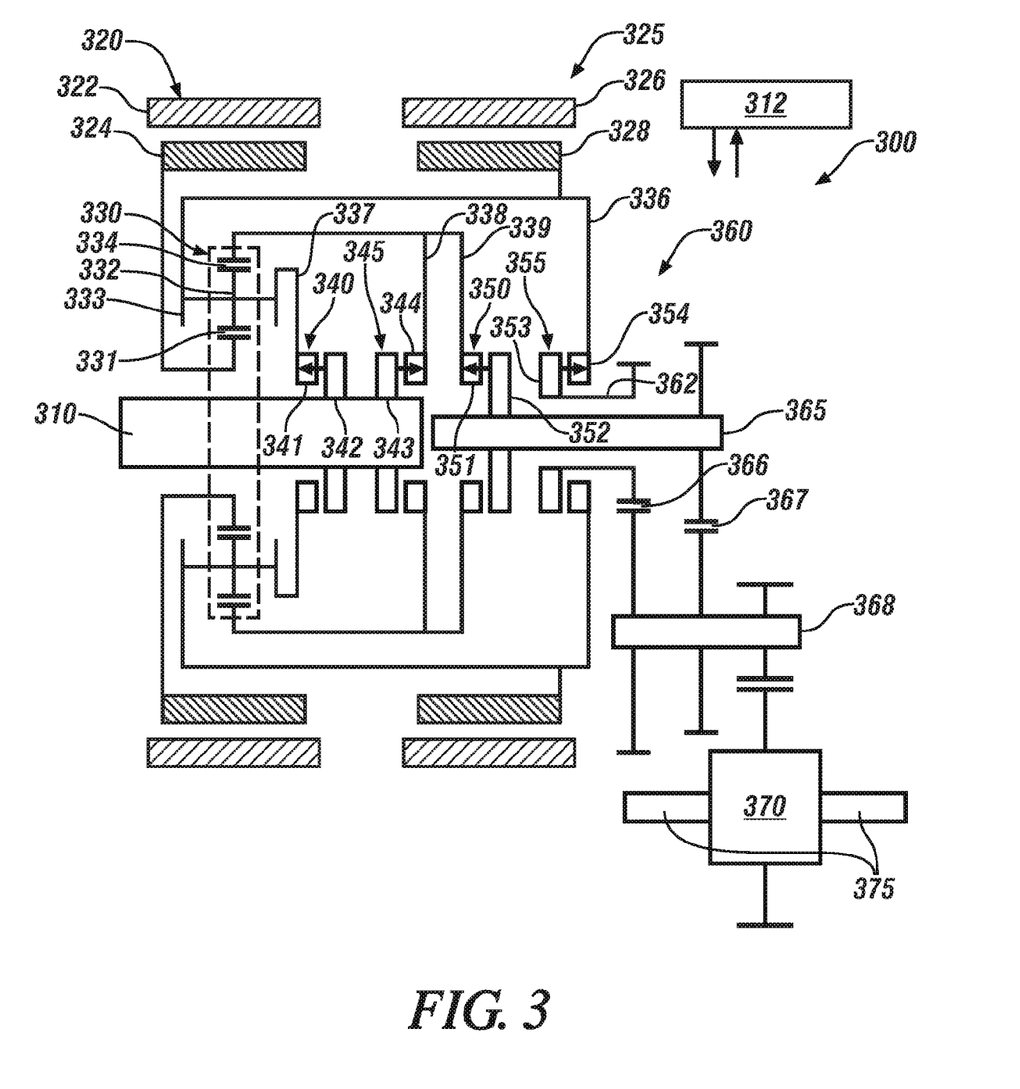
FIG. 3 schematically illustrates an embodiment of a multi-mode transmission for transferring mechanical power between a prime mover and an axle that includes an input member, first and second torque machines, a single planetary gearset, an output member, and a two-speed gearbox, in accordance with the disclosure.

FIG. 3 schematically illustrates another embodiment of a multi-mode transmission 300 for transferring mechanical power between a prime mover and axles that includes an input member 310, a single planetary gearset 330, an output member in the form of a first output member 365 and a second output member 362, and a controllable two-speed gearbox 360 that couples to a differential 370 that couples to axles 375 to drive one or a plurality of vehicle wheels. The prime mover may include an internal combustion engine that rotatably couples to the input member 310. First and second torque machines 320, 325, respectively, are integrated into the multi-mode transmission 300. In one non-limiting embodiment, and as described herein, the first and second torque machines 320, 325 are multi-phase electrically-powered motor/generators that electrically connect to high-voltage electrical energy storage devices via inverters and various electrical connectors and harnesses. The first torque machine 320 includes a stator 322 and a rotor 324. The second torque machine 325 includes a stator 326 and a rotor 328. Rotatable coupling and torque transfer between the input member 310, the first and second torque machines 320, 325, the single planetary gearset 330 and the two-speed gearbox 360 to the differential 370 is achieved by selective activation of first and second input clutches 340, 345, respectively and first and second output clutches 350, 355, respectively. In this embodiment, the first and second input clutches 340, 345 and the first and second output clutches 350, 355 are two-state clutch devices that include applied states and open states. Operation and monitoring of the first and second torque machines 320, 325 and control of the first and second input clutches 340, 345 and the first and second output clutches 350, 355 are controlled by a controller 312. The multi-mode transmission 300 may be equipped with various hydraulic circuits and actuators, rotational speed sensors, pressure sensors, temperature sensors, bearings and other known elements that are necessary for operation and not described herein in detail.

The first and second input clutches 340, 345 and the first and second output clutches 350, 355 may be friction plate clutches in one embodiment. The first input clutch 340 includes first plates 341 that engage first discs 342 when applied. The second input clutch 345 includes second plates 344 that engage second discs 343 when applied. First and second discs 342 and 343 are concentric to and attached to the input member 310. First and second plates 341 and 344 are connected to other elements described herein. The first output clutch 350 includes third plates 351 that engage third discs 352 when applied. The second output clutch 355 includes fourth plates 354 that engage fourth discs 353 when applied. The third disc 352 is concentric to and attached to the first output member 365 and the fourth disc 353 is concentric to and attached to the second output member 362. The second output member 362 is concentric to and contained with the first output member 365. Third and fourth plates 351 and 354 are connected to other elements described herein. Other suitable clutch devices and configurations may be employed, without limitation.

The planetary gearset 330 includes a sun gear 331 and a ring gear 334 with a plurality of intervening planet gears 332 coupled by a planet carrier 333. The sun gear 331 is preferably coaxial with the input member 310 and rotatably couples with the rotor 324 of the first torque machine 320.

The planet carrier 333 rotatably couples with a first rotating element 336 that rotatably couples with the plate 354 of the second output clutch 355 and rotatably couples with a second rotating element 337 that rotatably couples with the plate 341 of the first input clutch 340. The planet carrier 333 also rotatably couples via the first rotating element 336 with the rotor 328 of the second torque machine 325. The ring gear 334 rotatably couples with the plate 338 of the second input clutch 345, and rotatably couples via rotating member 339 with the plate 351 of the first output clutch 350.

The first input clutch 340 rotatably couples the input member 310 to the planet carrier 333 via the second rotating element 337 when applied. The second input clutch 345 rotatably couples the input member 310 with the ring gear 334 when applied. The first output clutch 350 rotatably couples the first output member 365 with the ring gear 334 and engages a second high-speed gearset 367 when applied. The second output clutch 355 rotatably couples the second output member 362 with the carrier 333 and engages a first low-speed gearset 366 when applied.

When the first input clutch 340 is controlled to the first, applied state, the input member 310 rotatably couples to the planet carrier 333 via the second rotating element 337 by engaging the first plate 341 with the first disc 342. When the first input clutch 340 is controlled to the second, disengaged state, the input member 310 is decoupled from the second rotating element 337. When the second input clutch 345 is controlled to the first, applied state, the input member 310 rotatably couples to the ring gear 334 via the third rotating element 338 by engaging the second plate 343 with the second disc 343. When the input clutch 340 is controlled to the third state, the input member 310 is disengaged therefrom.

When the first output clutch 350 is controlled to the first, applied state, the first output member 365 rotatably couples to the ring gear 334 via the fourth rotating member 339 by engaging the third plate 351. When the first output clutch 350 is controlled to the second, disengaged state, the first output member 365 is decoupled from the fourth rotating member 339. When the second output clutch 355 is controlled to the first applied state, the second output member 362 rotatably couples to the planet carrier 333 via the first rotating member 336 by engaging the fourth plate 353. When the second output clutch 355 is controlled to the second, disengaged state, the second output member 362 is disengaged therefrom.

The controllable two-speed gearbox 360 includes the first low-speed gearset 366 and the second high-speed gearset 367. The first low-speed gearset 366 and the second high-speed gearset 367 couple to a drive member 368 to transfer mechanical power to the differential 370 at different speed reduction ratios.

Operation of the multi-mode transmission 300 may be best described in context of a clutch activation table, as follows.

TABLE 3

| Transmission state | First Input Clutch State | Second Input Clutch State | First Output Clutch State | Second Output Clutch State |
|---|---|---|---|---|
| | Clutch States (engaged - 1, disengaged -0) | | | |
| Neutral | — | — | 0 | 0 |
| Input Split EVT | 0 | 1 | 0 | 1 |
| Output Split - EVT | 1 | 0 | 1 | 0 |
| EV | 0 | 0 | 0 | 1 |
| Fixed gear ratio 1-1 | 1 | 0 | 0 | 1 |
| Fixed gear ratio 1-2 | 1 | 0 | 1 | 1 |
| Fixed gear ratio 1-3 | 1 | 1 | 0 | 1 |
| Fixed gear ratio 2-1 | 0 | 1 | 1 | 0 |
| Fixed gear ratio 2-2 | 1 | 1 | 1 | 0 |
| Fixed gear ratio 2-3 | 0 | 1 | 1 | 1 |
| Input-Split Reverse | 0 | 1 | 0 | 1 |
| EV Reverse | 0 | 0 | 0 | 1 |

The transmission states include electrically variable transmission states, an electric-only (EV) state, fixed gear states, neutral and reverse that are achieved through selective activation of states of the first and second input clutches 340, 345 and the first and second output clutches 350, 355 as detailed in Table 3.

The input-split transmission state is an EVT state in which the multi-mode transmission 300 operates with a high effective transmission ratio, with the final drive ratio determined by the rotational speed of the first torque machine 320. Mechanical power that is input to the input member 310, e.g., from an internal combustion engine, may be split by transferring a portion to the first torque machine 320 and transferring a portion to the output member 365, with additional mechanical power transferred from the second torque machine 325 to the output member 365. This is accomplished by controlling the input clutch 340 in the second state (0), controlling the output clutch 350 to the first state (1) and controlling the final clutch 362 to the first state (1).

The output-split transmission state is an EVT state in which the multi-mode transmission 300 operates with a low effective transmission ratio, with the final drive ratio determined by the rotational speed of the second torque machine 325. Mechanical power that is input to the input member 310, e.g., from an internal combustion engine, may be transferred to the output member 365 along with power from the first torque machine 320. Mechanical power from the second torque machine 325 may be split between the output member 365 and the first torque machine 320. This is accomplished by controlling the input clutch 340 in the first state (1), controlling the output clutch 350 to the second state (0) and controlling the final clutch 362 to the second state (0).

Shifting between the transmission states may be accomplished synchronously by controlling the first and second output clutches 350, 355 to the neutral state (0) to disengage the drive member 368 from the multi-mode transmission 300. Such operation allows the first torque machine 320 to be controlled to a speed that achieves a synchronous shifting of the first and second input clutches 340, 345. The rotational speed of the output member 365 may be controlled to synchronously engage the first and second output clutches 350, 355.

Figure 4:
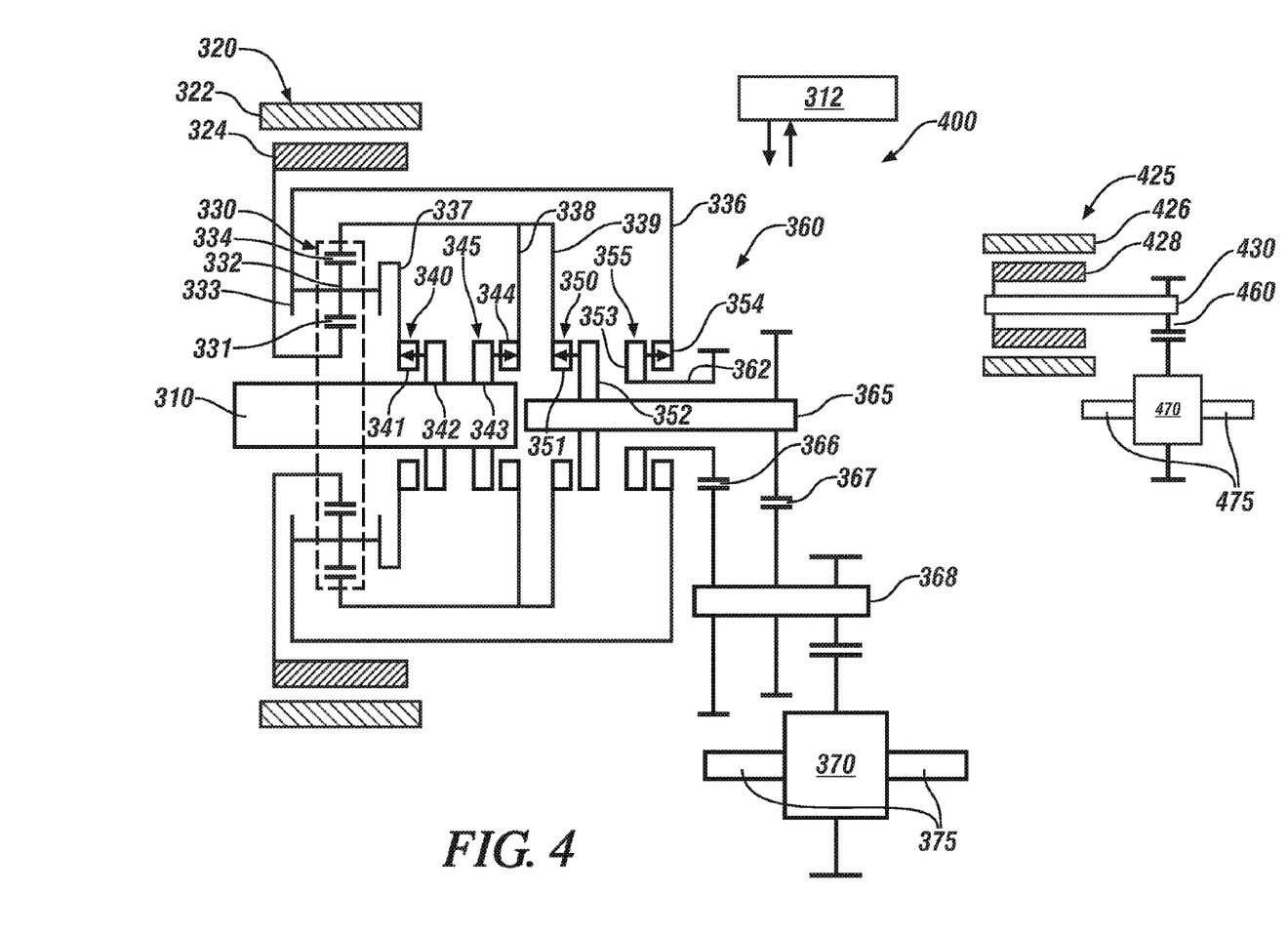
FIG. 4 schematically illustrates an embodiment of a multi-mode transmission for transferring mechanical power between a prime mover and an axle that includes an input member, a first torque machine, a single planetary gearset, an output member, and a two-speed gearbox, wherein a second torque machine rotatably couples to a second differential coupled to a second axle to provide four-wheel or all-wheel drive capability to a vehicle, in accordance with the disclosure.

FIG. 4 schematically illustrates an embodiment of the multi-mode transmission 400 that is analogous to the multi-mode transmission 300 shown with reference to FIG. 3. The multi-mode transmission 400 differs from the multi-mode transmission 300 in that the multi-mode transmission 400 employs only the first torque machine 20, and a second torque machine 425 including stator 426 and rotor 428 is rotatably coupled via a rotating member 430 to gearset 460 that rotatably couples to a second differential 470 that couples to second axles 475, thus providing four-wheel or all-wheel drive capability to the vehicle. Thus, in this embodiment the second torque machine 425 is not coupled to the first rotating element 36 coupled to the planetary gear set 30. Operation of the multi-mode transmission 400 may be best described in context of a clutch activation table, as follows.

TABLE 4

| Transmission state | First Input Clutch State | Second Input Clutch State | First Output Clutch State | Second Output Clutch State |
|---|---|---|---|---|
| | Clutch States (engaged - 1, disengaged -0) | | | |
| Neutral | — | — | 0 | 0 |
| First Input Split EVT1 | 0 | 1 | 0 | 1 |
| Second Input Split - EVT2 | 1 | 0 | 1 | 0 |
| EV | 0 | 0 | 0 | 0 |
| Fixed gear ratio 1-1 | 1 | 0 | 0 | 1 |
| Fixed gear ratio 1-2 | 1 | 0 | 1 | 1 |
| Fixed gear ratio 1-3 | 1 | 1 | 0 | 1 |
| Fixed gear ratio 2-1 | 0 | 1 | 1 | 0 |
| Fixed gear ratio 2-2 | 1 | 1 | 1 | 0 |
| Fixed gear ratio 2-3 | 0 | 1 | 1 | 1 |
| EV Reverse | 0 | 0 | 0 | 0 |
| Series Reverse | 1 | 1 | 0 | 0 |

The transmission states include electrically variable transmission states, electric-only (EV) states, fixed gear states, neutral and reverse that are achieved through selective activation of states of the first and second input clutches 340, 345 and the first and second output clutches 350, 355 as detailed in Table 4. The rotational speed of the second torque machine 425 is proportional to vehicle speed in this embodiment.

Embodiments of the multi-mode transmission describe herein enable a compact, low part content multi-mode transmission capable of high energy efficiency through a reduction in recirculated power in input-split EVT and output split EVT modes. The two-speed ratio controllable two-speed gearbox 60 extends the speed/load operating range of the multi-mode transmission with improved performance.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A transmission for transferring mechanical power between an input member and a drive member, the transmission comprising:
 a single planetary gearset, a first torque machine, an output member and a two-speed gearset that is coupled to the drive member;
 the single planetary gearset including a sun gear, a carrier gearset and a ring gear, wherein the carrier gearset is rotatably couplable to the input member and rotatably couplable to the output member, the sun gear is rotatably coupled to a rotor of the first torque machine, and the ring gear is rotatably couplable to the input member and rotatably couplable to the output member; and
 the output member rotatably couplable to the two-speed gearset, wherein the two-speed gearset is configured to operate in one of a first gear ratio and a second gear ratio;
 wherein the transmission operates at a first final drive ratio to transfer power between the input member, the drive member and the first torque machine by coupling the input member to the ring gear, coupling the output member to the carrier gearset, and operating the two-speed output gearset at the first gear ratio; and
 wherein the transmission operates at a second final drive ratio to transfer power between the input member, the drive member and the first torque machine by coupling the input member to the carrier gearset, coupling the output member to the ring gear, and operating the two-speed output gearset at the second gear ratio.

2. The transmission of claim 1, further comprising a second torque machine rotatably coupled to the carrier gearset to generate mechanical power transferable thereto.

3. The transmission of claim 1, further comprising:
 the drive member rotatably coupled to a first differential that is rotatably coupled to a first drive axle; and
 a second torque machine rotatably coupled to a second differential that is rotatably coupled to a second drive axle.

4. The transmission of claim 1, further comprising the output member rotatably couplable to the two-speed gearset via a final clutch, the final clutch operable in a first state, a second state or a third state, wherein the output member rotatably couples to the drive member at the first gear ratio when the final clutch is in the first state, wherein the output member rotatably couples to the drive member at the second gear ratio when the final clutch is in the second state, and wherein the output member disconnects from the drive member when the final clutch is in the third state.

5. The transmission of claim 1, further comprising a first output clutch coupled to the carrier member and a second output clutch coupled to the sun gear, and wherein the output member includes a first output member and a second output member;
 wherein the first output member rotatably couples to the drive member at the first gear ratio by activation of the first output clutch;
 wherein the second output member rotatably couples to the drive member at the second gear ratio by activation of the second output clutch; and
 wherein the transmission decouples from the output member when the first and second output clutches are deactivated.

6. The transmission of claim 1, further comprising the transmission operative in a fixed gear ratio to transfer power between the input member, the drive member and the first torque machine by coupling the input member to the carrier gearset, coupling the output member to the carrier gearset, and controlling the two-speed gearset at the first ratio.

7. The transmission of claim 1, further comprising the transmission operative in a fixed gear ratio to transfer power between the input member, the drive member and the first torque machine by coupling the input member to the ring gear, coupling the output member to the ring gear, and operating the two-speed gearset at the second ratio.

8. The transmission of claim 1, further comprising an input clutch, an output clutch and a final clutch, wherein the input clutch, the output clutch and the final clutch are three-state clutch devices operative in one of a first state, a second state and a third state; and wherein the input clutch is arranged between the input member and the planetary gearset such that the input member couples to the carrier gearset when the input clutch operates in the first state, the input member couples to the ring gear when the input clutch operates in the second state, and the input member is decoupled from the planetary gearset when the input clutch operates in the third state;

wherein the output clutch is arranged between the output member and the planetary gearset such that the output member couples to the carrier gearset when the output clutch operates in the first state, the output member couples to the ring gear when the output clutch operates in the second state, and the output member is decoupled from the planetary gearset when the output clutch operates in the third state; and wherein the final clutch is arranged between the output member and the drive member such that the output member couples to the drive member with the two-speed gearset operating at the first gear ratio when the final clutch is in a first state, the output member couples to the drive member with the two-speed gearset operating at the second gear ratio when the final clutch is in a second state, and the output member decouples from the drive member when the final clutch is in a third state.

9. The transmission of claim 8, wherein the three-state clutch devices of the input clutch, the output clutch and the final clutch comprise double-sided dog clutches.

10. The transmission of claim 8, wherein the transmission is operative in an electric-only state, an electrically-variable state, a fixed gear state, a neutral state and a reverse state through selective activation of the input clutch and the output clutch.

11. The transmission of claim 1, further comprising a first input clutch, a second input clutch, a first output clutch and a second output clutch;

wherein the first input clutch, the second input clutch, the first output clutch and the second output clutch are two-state clutch devices that are each operative in one of an applied state and an open state;

wherein the first input clutch is arranged between the input member and the planetary gearset such that the input member couples to the carrier gearset when the first clutch is in the applied state;

wherein the second input clutch is arranged between the input member and the planetary gearset such that the input member couples to the ring gear when the second clutch is in the applied state;

wherein the first output clutch is arranged between the output member, the planetary gearset and the two-speed output gearset such that the ring gear couples to the drive member via the output member and the two-speed output gearset operating at the first gear ratio when the first output clutch is in the applied state; and wherein the second output clutch is arranged between the output member, the planetary gearset and the two-speed output gearset such that the carrier gearset couples to the drive member via the output member and the two-speed output gearset operating at the second gear ratio when the second output clutch is in the applied state.

12. The transmission of claim 11, wherein the transmission is operative in an electric-only state, an electrically-variable state, a fixed gear state, a neutral state and a reverse state through selective activation of the first and second input clutches and the first and second output clutches.

13. A transmission for transferring mechanical power between an input member and a drive member, the transmission comprising:

a single planetary gearset, a first torque machine, a second torque machine, an output member and a two-speed gearset that is coupled to the drive member;

the single planetary gearset including a sun gear, a carrier gearset and a ring gear, wherein the carrier gearset is rotatably couplable to the input member and rotatably couplable to the output member, the sun gear is rotatably coupled to a rotor of the first torque machine, the carrier gearset is rotatably coupled to a rotor of the second torque machine and the ring gear is rotatably couplable to the input member and rotatably couplable to the output member; and the output member rotatably couplable to the two-speed gearset, wherein the two-speed gearset is configured to operate in one of a first gear ratio and a second gear ratio;

wherein the transmission operates in an input power split mode at a first final drive ratio to transfer power between the input member, the drive member and the first and second torque machines by coupling the input member to the ring gear, coupling the output member to the carrier gearset, and coupling the two-speed output gearset to the output member to operate in the first gear ratio; and wherein the transmission operates in an output power split mode at a second final drive ratio to transfer power between the input member, the drive member and the first and second torque machines by coupling the input member to the carrier gearset, coupling the output member to the ring gear, and coupling the two-speed output gearset to the output member to operate in the second gear ratio.

14. The transmission of claim 13, further comprising the output member rotatably couplable to the two-speed gearset via a final clutch, the final clutch operable in a first state, a second state or a third state, wherein the output member rotatably couples to the drive member at the first gear ratio when the final clutch is in the first state, wherein the output member rotatably couples to the drive member at the second gear ratio when the final clutch is in the second state, and wherein the output member disconnects from the drive member when the final clutch is in the third state.

15. The transmission of claim 13, further comprising a first output clutch coupled to the carrier member and a second output clutch coupled to the sun gear, and wherein the output member includes a first output member and a second output member;

wherein the first output member rotatably couples to the drive member at the first gear ratio by activation of the first output clutch;

wherein the second output member rotatably couples to the drive member at the second gear ratio by activation of the second output clutch; and wherein the transmission decouples from the output member when the first and second output clutches are deactivated.

16. The transmission of claim 13, further comprising an input clutch, an output clutch and a final clutch, wherein the input clutch, the output clutch and the final clutch are three-state clutch devices operative in one of a first state, a second state and a third state; and wherein the input clutch is arranged between the input member and the planetary gearset such that the input member couples to the carrier gearset when the input clutch operates in the first state, the input member couples to the ring gear when the input clutch operates in the second state, and the input member is decoupled from the planetary gearset when the input clutch operates in the third state;

wherein the output clutch is arranged between the output member and the planetary gearset such that the output member couples to the carrier gearset when the output clutch operates in the first state, the output member couples to the ring gear when the output clutch operates in the second state, and the output member is decoupled from the planetary gearset when the output clutch operates in the third state; and wherein the final clutch is arranged between the output member and the drive member such that the output member couples to the drive member with the two-speed gearset operating at the first gear ratio when the final clutch is in a first state, the output member couples to the drive member with the two-speed gearset operating at the second gear ratio when the final clutch is in a second state, and the output member decouples from the drive member when the final clutch is in a third state.

17. The transmission of claim 13, further comprising a first input clutch, a second input clutch, a first output clutch and a second output clutch;

wherein the first input clutch, the second input clutch, the first output clutch and the second output clutch are two-state clutch devices that are each operative in one of an applied state and an open state;

wherein the first input clutch is arranged between the input member and the planetary gearset such that the input member couples to the carrier gearset when the first clutch is in the applied state;

wherein the second input clutch is arranged between the input member and the planetary gearset such that the input member couples to the ring gear when the second clutch is in the applied state;

wherein the first output clutch is arranged between the output member, the planetary gearset and the two-speed output gearset such that the ring gear couples to the drive member via the output member and the two-speed output gearset operating at the first gear ratio when the first output clutch is in the applied state; and wherein the second output clutch is arranged between the output member, the planetary gearset and the two-speed output gearset such that the carrier gearset couples to the drive member via the output member and the two-speed output gearset operating at the second gear ratio when the second output clutch is in the applied state.

18. The transmission of claim 17, wherein the transmission is operative in an electric-only state, an electrically-variable state, a fixed gear state, a neutral state and a reverse state through selective activation of the first and second input clutches and the first and second output clutches.

* * * * *